(12) United States Patent
Yamaguchi et al.

(10) Patent No.: US 12,148,979 B2
(45) Date of Patent: Nov. 19, 2024

(54) TRANSPARENT ANTENNA AND RF TAG

(71) Applicant: ASAHI KASEI KABUSHIKI KAISHA, Tokyo (JP)

(72) Inventors: Fujito Yamaguchi, Tokyo (JP); Akira Ikeda, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 180 days.

(21) Appl. No.: 17/799,373

(22) PCT Filed: Feb. 8, 2021

(86) PCT No.: PCT/JP2021/004675
§ 371 (c)(1),
(2) Date: Aug. 12, 2022

(87) PCT Pub. No.: WO2021/161972
PCT Pub. Date: Aug. 19, 2021

(65) Prior Publication Data
US 2023/0056766 A1 Feb. 23, 2023

(30) Foreign Application Priority Data
Feb. 13, 2020 (JP) .................. 2020-022882

(51) Int. Cl.
*H01Q 1/22* (2006.01)
*G06K 19/077* (2006.01)
(Continued)

(52) U.S. Cl.
CPC ....... *H01Q 1/2225* (2013.01); *G06K 19/0775* (2013.01); *G06K 19/07773* (2013.01); *H01Q 1/38* (2013.01); *H01Q 7/00* (2013.01)

(58) Field of Classification Search
CPC ......... G06K 19/0775; G06K 19/07773; G06K 19/07783; H01Q 1/2225; H01Q 1/364; H01Q 1/38; H01Q 7/00; H01Q 9/285
See application file for complete search history.

(56) References Cited

U.S. PATENT DOCUMENTS

| 6,372,541 B1 | 4/2002 | Bouchez et al. |
| 2007/0138303 A1* | 6/2007 | Asakura ........... G06K 19/07749 235/492 |

(Continued)

FOREIGN PATENT DOCUMENTS

| JP | 2001-5944 A | 1/2001 |
| JP | 2003-209421 A | 7/2003 |

(Continued)

OTHER PUBLICATIONS

Supplementary European Search Report for corresponding European Application No. 21753208.4, dated Jun. 21, 2023.

(Continued)

*Primary Examiner* — Thien M Le
(74) *Attorney, Agent, or Firm* — Birch, Stewart, Kolasch & Birch, LLP

(57) ABSTRACT

Provided is a transparent antenna comprising a transparent base material, an antenna part, and a joint part electrically bonded to the antenna part, the antenna part and the joint part being arranged on the transparent base material, wherein the joint part has a first conductive pattern and a first opening part without the first conductive pattern formed thereon, the antenna part has a second conductive pattern and a second opening part without the second conductive pattern formed thereon, surface free energy $E_1$ of the first conductive pattern is 60 mJ/m² or less, and surface free energy $E_0$ of the transparent base material at the first opening part is larger than the surface free energy $E_1$.

8 Claims, 3 Drawing Sheets

(51) Int. Cl.
  *H01Q 1/38* (2006.01)
  *H01Q 7/00* (2006.01)

(56) References Cited

U.S. PATENT DOCUMENTS

| | | | |
|---|---|---|---|
| 2008/0170982 A1* | 7/2008 | Zhang | D02G 3/44 |
| | | | 423/447.3 |
| 2010/0237038 A1* | 9/2010 | Chiang | H01Q 1/38 |
| | | | 427/126.3 |
| 2013/0264390 A1 | 10/2013 | Frey et al. | |
| 2014/0198264 A1 | 7/2014 | Gao et al. | |
| 2014/0251662 A1* | 9/2014 | Rotto | H05K 1/0216 |
| | | | 977/932 |
| 2015/0144704 A1 | 5/2015 | Rogy et al. | |
| 2015/0310963 A1* | 10/2015 | Markham | H05K 3/1258 |
| | | | 427/118 |
| 2015/0313009 A1* | 10/2015 | Markham | H05K 3/247 |
| | | | 174/251 |
| 2016/0147337 A1 | 5/2016 | Lee | |
| 2016/0264078 A1* | 9/2016 | McGuire, Jr. | B60R 16/023 |
| 2018/0023793 A1* | 1/2018 | Lowenthal | H01L 33/32 |
| | | | 362/296.09 |
| 2018/0069326 A1* | 3/2018 | Van Gils | H01Q 21/28 |
| 2018/0368255 A1* | 12/2018 | Shih | B29C 48/0018 |
| 2020/0268293 A1* | 8/2020 | Gassler | A61B 5/14546 |
| 2020/0403301 A1 | 12/2020 | Ryu et al. | |
| 2021/0321512 A1 | 10/2021 | Kamijo et al. | |
| 2022/0167499 A1* | 5/2022 | Johnston | H05K 1/0296 |

FOREIGN PATENT DOCUMENTS

| | | |
|---|---|---|
| JP | 2009-517730 A | 4/2009 |
| JP | 2011-66610 A | 3/2011 |
| JP | 2011-66691 A | 3/2011 |
| JP | 2011-91788 A | 5/2011 |
| JP | 2011-159481 A | 8/2011 |
| JP | 2013-131156 A | 7/2013 |
| JP | 2014-501465 A | 1/2014 |
| JP | 2014-519129 A | 8/2014 |
| JP | 2016-105624 A | 6/2016 |
| JP | 2017-175540 A | 9/2017 |
| JP | 2019-61697 A | 4/2019 |
| JP | 2019-211243 A | 12/2019 |
| WO | WO 2019/172609 A1 | 9/2019 |
| WO | WO 2020/027162 A1 | 2/2020 |

OTHER PUBLICATIONS

International Preliminary Report on Patentability dated Aug. 11, 2022, and English translation of the Written Opinion of the International Searching Authority for International Application No. PCT/JP2021/004675, dated Apr. 20, 2021.
International Search Report, issued in PCT/JP2021/004675, dated Apr. 20, 2021.
Written Opinion of the International Searching Authority, issued in PCT/JP2021/004675, dated Apr. 20, 2021.

* cited by examiner

[Figure 1]
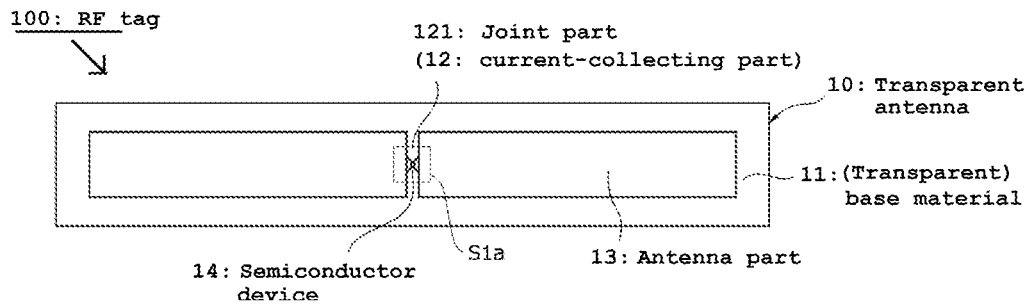
[Figure 2]
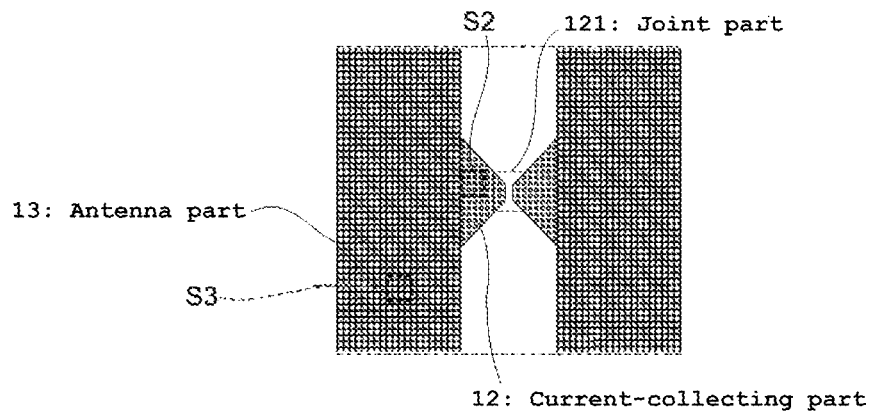
[Figure 3]
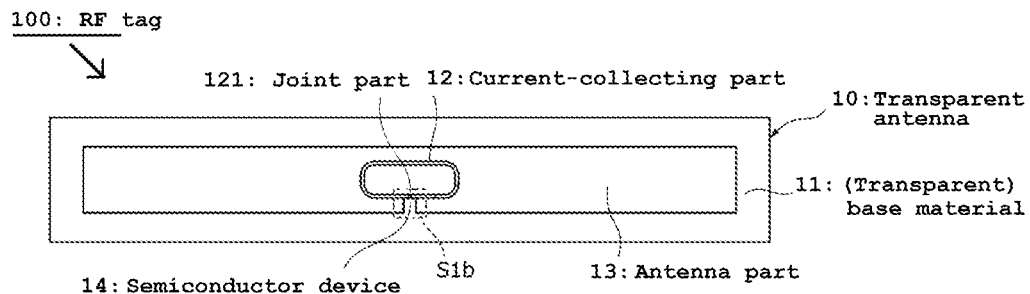

[Figure 4]
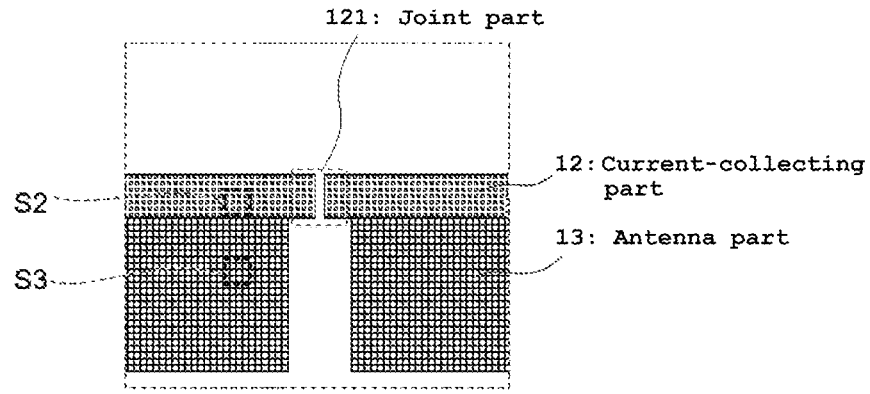
[Figure 5]
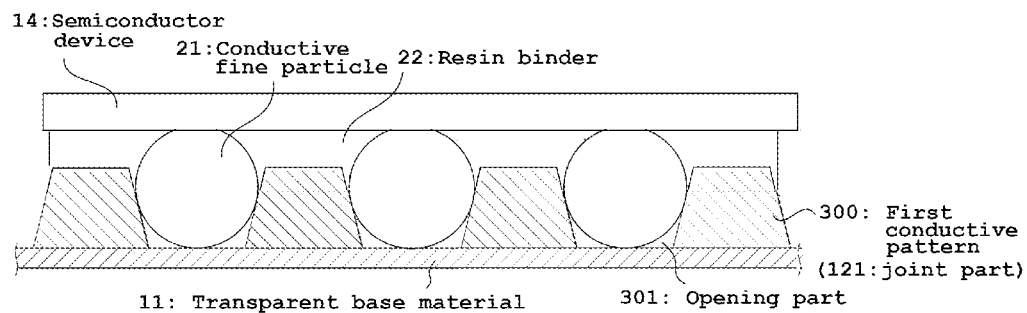
[Figure 6]
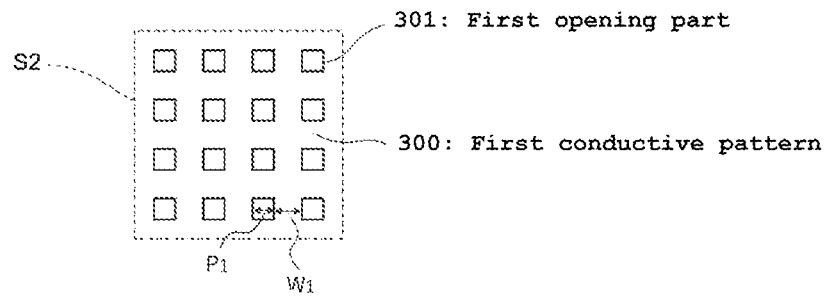
[Figure 7]
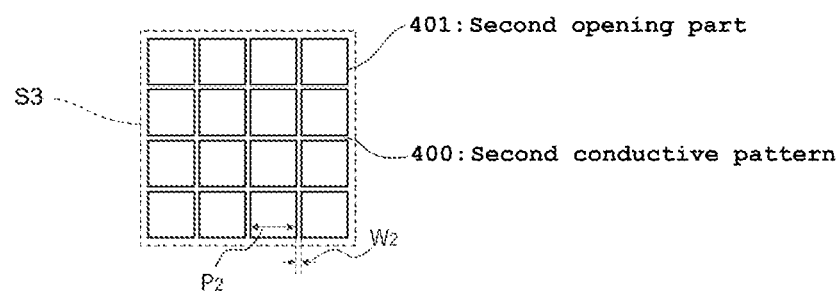

[Figure 8]
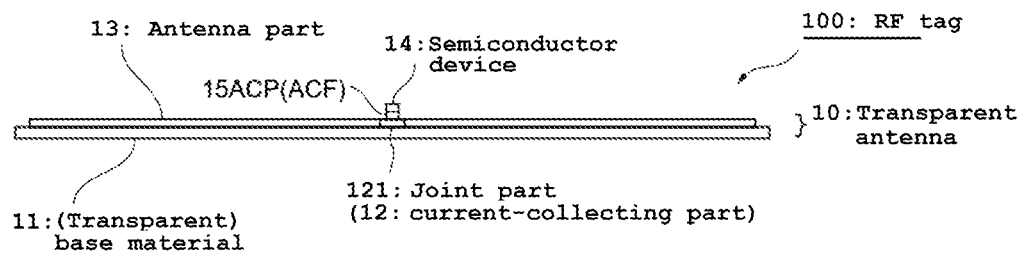

TRANSPARENT ANTENNA AND RF TAG

TECHNICAL FIELD

The present invention relates to a transparent antenna and an RF tag.

BACKGROUND ART

For example, in automobiles, film antennas installed in windshields or the like are known as antennas for receiving various radio waves such as television radio waves or FM radio waves, radio waves related to information on positional coordinates from GPS (global positioning system) satellite for use in car navigation systems, etc.

The film antennas are also used as radio frequency identification (RFID) which is widely used in many industries including shipping, conveyance, production, waste management, tracking of mails, baggage reconciliation for aircrafts, and toll management for toll roads. RFID tags and labels are useful for tracking delivery from suppliers to customers and through supply chains.

As for such film antennas, a technique of improving the invisibility of a conductive pattern by forming an antenna as the conductive pattern has been proposed (see, for example, Patent Literatures 1 to 5).

CITATION LIST

Patent Literature

Patent Literature 1: Japanese Patent Laid-Open No. 2011-66610
Patent Literature 2: Japanese Patent Laid-Open No. 2011-91788
Patent Literature 3: Japanese Patent Laid-Open No. 2017-175540
Patent Literature 4: Japanese Patent Laid-Open No. 2003-209421
Patent Literature 5: Japanese Patent Laid-Open No. 2016-105624

SUMMARY OF INVENTION

Technical Field

As described in the conventional techniques, finer conductive patterns improve their invisibility. However, such finer conductive pattern may make it difficult to bond a conductive pattern constituting an antenna to an IC chip to be electrically connected thereto.

In this context, Patent Literature 4 discloses that for the bonding of an IC chip, a child antenna pattern is formed around the IC chip beforehand to form an IC chip label, and then, the bonding is performed such that the child antenna pattern of the IC chip label is electrically continuous with a parent antenna pattern formed on a base material. Patent Literature 5 discloses that an IC chip is bonded to a conductive pattern constituting an antenna using an anisotropic conductive paste (ACP).

However, particularly, when a pattern that forms an antenna contains, for example, a conductive fine wire having a line width of 5 µm or smaller in order to improve the invisibility of the pattern, the conductive pattern constituting the antenna may be difficult to bond to an IC chip electrically connected thereto.

The present invention has been made in light of the problems described above. An object of the present invention is to provide a transparent antenna excellent in the bondability of a semiconductor device and an RF tag comprising the transparent antenna.

Solution to Problem

The present inventors have conducted diligent studies to attain the object. As a result, the present inventors have completed the present invention by finding that the object can be attained by adjusting the surface free energy of a conductive pattern at a part to be contacted with an anisotropic conductive adhesive, and the surface free energy of a transparent base material.

Specifically, the present invention is as follows.

[1]
A transparent antenna comprising
a transparent base material,
an antenna part, and a joint part electrically bonded to the antenna part, the antenna part and the joint part being arranged on the transparent base material, wherein
the joint part has a first conductive pattern and a first opening part without the first conductive pattern formed thereon,
the antenna part has a second conductive pattern and a second opening part without the second conductive pattern formed thereon,
a surface free energy $E_1$ of the first conductive pattern is 60 mJ/m² or less, and
a surface free energy $E_0$ of the transparent base material at the first opening part is larger than the surface free energy $E_1$.

[2]
The transparent antenna according to [1], wherein
the second conductive pattern has a second conductive fine wire having line width $W_2$ of 0.25 µm or larger and 5.0 µm or smaller.

[3]
The transparent antenna according to [1] or [2], wherein
a height $T_1$ of the first conductive pattern is 0.05 µm or larger and 1.0 µm or smaller, and
a height $T_2$ of the second conductive pattern is 0.05 µm or larger and 1.0 µm or smaller.

[4]
The transparent antenna according to any one of [1] to [3], wherein
the first conductive pattern has a first conductive fine wire, and the second conductive pattern has a second conductive fine wire, wherein
pitch $P_1$ of the first conductive fine wire is smaller than pitch $P_2$ of the second conductive fine wire,
the pitch $P_1$ is 1.0 µm or larger and 10 µm or smaller, and
the pitch $P_2$ is 20 µm or larger and 1000 µm or smaller.

[5]
The transparent antenna according to any one of [1] to [4], wherein
occupied area ratio $S_1$ of the first conductive pattern per unit area is larger than occupied area ratio $S_2$ of the second conductive pattern per unit area,
the occupied area ratio $S_1$ is 30% or more and 90% or less, and
the occupied area ratio $S_2$ is 0.1% or more and 10.0% or less.

[6]

The transparent antenna according to any one of [1] to [5], wherein difference between the surface free energy $E_0$ and the surface free energy $E_1$ ($E_0-E_1$) is 10 to 30 mJ/m$^2$.

[7]

An RF tag comprising the transparent antenna according to any one of [1] to [6], and a semiconductor device electrically bonded to the joint part of the transparent antenna.

[8]

The RF tag according to [7], wherein the semiconductor device is electrically bonded to the joint part through an anisotropic conductive adhesive.

Advantageous Effects of Invention

The present invention can provide a transparent antenna excellent in the bondability of a semiconductor device and an RF tag comprising the transparent antenna.

BRIEF DESCRIPTION OF DRAWINGS

FIG. 1 shows a plane view showing a straight-type form of the RF tag of the present embodiment.

FIG. 2 shows an enlarged view of S1a of FIG. 1.

FIG. 3 shows a plane view showing a loop-type form of the RF tag of the present embodiment.

FIG. 4 shows an enlarged view of S1b of FIG. 3.

FIG. 5 shows a schematic cross-sectional view when a semiconductor device is bonded onto a joint part of the RF tag of the present embodiment via an anisotropic conductive adhesive.

FIG. 6 shows an enlarged view (a) of S2 of FIGS. 2 and 4.

FIG. 7 shows an enlarged view (a) of S3 of FIGS. 2 and 4.

FIG. 8 shows a schematic cross-sectional view of the RF tag of the present embodiment.

DESCRIPTION OF EMBODIMENTS

Hereinafter, the mode for carrying out the present invention (hereinafter, referred to as the "present embodiment") will be described in detail. However, the present invention is not limited by the present embodiment, and various changes or modifications can be made therein without departing from the spirit of the present invention. In the drawings, the same reference signs will be used to designate the same or similar components, so that the overlapping description will be omitted. The positional relationships indicated by the terms "up", "down", "right", and "left" are based on the positional relationships shown in the drawings, unless otherwise specified. The dimensional ratios of the drawings are not limited to the ratios shown therein.

[Transparent Antenna]

The transparent antenna of the present embodiment comprises a transparent base material, an antenna part, and a joint part electrically bonded to the antenna part, the antenna part and the joint part being arranged on the transparent base material, wherein the joint part has a first conductive pattern and a first opening part without the first conductive pattern formed thereon, the antenna part has a second conductive pattern and a second opening part without the second conductive pattern formed thereon, surface free energy $E_1$ of the first conductive pattern is 60 mJ/m$^2$ or less, and surface free energy $E_0$ of the transparent base material at the first opening part is larger than the surface free energy $E_1$.

FIG. 1 shows a plane view showing one form of RF tag 100 comprising transparent antenna 10 of the present embodiment. The transparent antenna 10 of the present embodiment has transparent base material 11, and current-collecting part 12 and antenna part 13 formed on the transparent base material 11. The current-collecting part 12 is electrically connected to the antenna part 13 and refers to a part where the antenna part 13 collects, toward semiconductor device 14, electricity generated in response to a predetermined frequency. Joint part 121 refers to a part, of the current-collecting part 12, bonded to the semiconductor device 14. Hereinafter, the current-collecting part 12 and its joint part 121 are also collectively referred to as "current-collecting part 12 (joint part 121)" if both the components do not have to be discriminated therebetween. The mere term "current-collecting part 12" does not mean the current-collecting part 12 excluding the joint part 121.

FIG. 2 shows an enlarged view of S1a of FIG. 1. In FIG. 2, the current-collecting part 12 has joint part 121 with two or more ends facing each other. The semiconductor device 14 is electrically bonded to the joint part 121 through an anisotropic conductive adhesive or the like. The antenna part 13 is electrically connected to the joint part 121 and can receive radio waves with a predetermined frequency and transmit electrical signals to the semiconductor device 14 or can send radio waves with a predetermined frequency in response to the output of the semiconductor device 14. Although FIG. 2 shows trapezoidal current-collecting part 12, the shape of the current-collecting part 12 is not limited thereto. As one example, it is preferred that the current-collecting part 12 in FIG. 2 should have an area equivalent to the projected area of the semiconductor device to several times the projected area thereof when planarly viewed and the current-collecting part 12 should be almost covered up with the semiconductor device 14 bonded to the joint part 121. In this case, the current-collecting part 12 may consist substantially of only the joint part 121.

Although FIG. 1 shows straight-type transparent antenna 10 and RF tag 100 having two antenna parts 13 between which current-collecting part 12 having joint part 121 is disposed, the forms of the current-collecting part 12 (joint part 121) and the antenna part 13 are not limited thereto. For example, the transparent antenna 10 of the present embodiment or the RF tag 100 may be loop-type transparent antenna 10 and RF tag 100 having loop-shaped current-collecting part 12, as shown in FIG. 3, around which the antenna part 13 is placed.

FIG. 4 shows an enlarged view of S1b of FIG. 3. As shown in FIG. 4, the loop-type current-collecting part 12 has joint part 121 with loop ends facing each other. The joint part 121 is a region that constitutes the ends of the current-collecting part 12 and is bonded to the semiconductor device 14.

The transparent antenna of the present embodiment is not limited by the configuration of a $\lambda/2$ dipole antenna and may have other antenna configurations such as a grounded $\lambda/4$ monopole antenna, and the current-collecting part 12 (joint part 121) and the antenna part 13 can accordingly assume various forms.

Subsequently, the bondability of the semiconductor device will be described. As described above, the semiconductor device 14 is electrically bonded to the joint part 121 through an anisotropic conductive adhesive or the like. The anisotropic conductive adhesive typically contains a resin binder containing a precursor of epoxy resin or the like, and, for example, 10 to 30% by weight of conductive fine particles, such as Ni, Ag, Au, Pt, with a particle size of 3 μm to 10 μm dispersed in the resin binder. In the anisotropic conductive adhesive interposed between electrodes, the resin binder is spread out by the application of pressure under heating so that the conductive fine particles electrically bond the electrodes. The anisotropic conductive adhesive is known as film type, paste type, or liquid type, etc., depending on difference in this step of bonding.

Such bonding requires spreading out the anisotropic conductive adhesive until a thickness that allows the conductive fine particles to electrically bond the electrodes. Hence, it is desirable that the anisotropic conductive adhesive should wet and spread sufficiently for regions to be bonded. However, if the anisotropic conductive adhesive leaks to regions peripheral to the semiconductor device and wets and spreads therein, poor appearance of the resulting RF tag as well as unintended electrical bonding might occur. Particularly, in the case of using a transparent antenna, a metallic part derived from the anisotropic conductive adhesive, if emerging in regions peripheral to the semiconductor device, is particularly conspicuous and consequently impairs commodity value of transparency. Furthermore, the amount of the anisotropic conductive adhesive used is difficult to adjust due to the miniaturization of semiconductor devices, and leak tends to facilitate reduction in yield.

By contrast, in the present embodiment, adjusted surface free energy of the joint part 121 improves the electrical bonding reliability of the anisotropic conductive adhesive and suppresses poor appearance ascribable to the leak of the anisotropic conductive adhesive. Specifically, joint part 121 having a first conductive pattern and a first opening part without the first conductive pattern formed thereon is used. Further, surface free energy E of the first conductive pattern is set to 60 mJ/m$^2$ or less, and surface free energy $E_0$ of the transparent base material at the first opening part is adjusted so as to be larger than the surface free energy $E_1$.

As a result, a part where the anisotropic conductive adhesive wets easily (first opening part 301) and a part where the anisotropic conductive adhesive is less likely to wet (first conductive pattern 300) can be formed in the joint part 121. FIG. 5 shows a schematic cross-sectional view when the semiconductor device 14 is bonded onto the joint part 121 via the anisotropic conductive adhesive. As shown in FIG. 5, the anisotropic conductive adhesive wets easily at the first opening part 301. This facilitates conductive fine particle 21 to bond the first conductive pattern 300 to the semiconductor device 14. Hence, poor bonding is reduced, and the stability of wiring bonding is further improved. In addition, the anisotropic conductive adhesive is less likely to wet in the first conductive pattern 300, and it is possible to prevent the anisotropic conductive adhesive from exuding beyond the first conductive pattern 300. Thus, the stop position of the spread of the anisotropic conductive adhesive can be precisely controlled among the lines of the pattern.

From the viewpoint as described above, the difference between the surface free energy $E_0$ and the surface free energy $E_1$ ($E_0-E_1$) is preferably 10 to 30 mJ/m$^2$, more preferably 15 to 25 mJ/m$^2$, further preferably 17 to 22 mJ/m$^2$. The difference ($E_0-E_1$) is 10 mJ/m$^2$ or more, whereby the difference between the part where the anisotropic conductive adhesive wets easily and the part where the anisotropic conductive adhesive is less likely to wet is further increased, so that the leak of the anisotropic conductive adhesive tends to be further suppressed. The difference ($E_0-E_1$) is 30 mJ/m$^2$ or less, whereby poor bonding ascribable to the wettability of the first conductive pattern 300 reduced too much tends to be further suppressed.

From a similar viewpoint, the surface free energy $E_0$ is preferably 45 to 100 mJ/m$^2$, more preferably 50 to 90 mJ/m$^2$, further preferably 60 to 80 mJ/m$^2$. The surface free energy $E_0$ is 45 mJ/m$^2$ or larger, whereby the first opening part 301 is easily filled with the anisotropic conductive adhesive, so that the bonding reliability of the semiconductor device 14 tends to be further improved. The surface free energy $E_0$ is 100 mJ/m$^2$ or smaller, whereby the incorporation of air bubbles, etc. can be prevented because of ensured wettability of the opening part of the transparent base material and the anisotropic conductive adhesive, so that adhesion stability tends to be further improved.

From a similar viewpoint, the surface free energy $E_1$ is 60 mJ/m$^2$ or smaller, preferably 10 to 60 mJ/m$^2$, more preferably 20 to 60 mJ/m$^2$, further preferably 30 to 60 mJ/m$^2$. The surface free energy $E_1$ is 10 mJ/m$^2$ or larger, whereby poor bonding ascribable to the wettability of the first conductive pattern 300 reduced too much tends to be further suppressed. The surface free energy $E_1$ is 60 mJ/m$^2$ or smaller, whereby the leak of the anisotropic conductive adhesive is further suppressed.

The detailed mechanism under which when the surface free energy E falls within the range described above, the leak of the anisotropic conductive adhesive is suppressed is unknown and however, is presumably as follows: the surface tension of the resin binder containing the precursor of epoxy resin or the like, which constitutes the anisotropic conductive adhesive, is basically 40 mJ/m$^2$ to 50 mJ/m$^2$. If $E_1$ is too smaller than this value, the anisotropic conductive adhesive is less likely to wet on the first conductive pattern, leading to reduced electrical bonding characteristics. On the other hand, if $E_1$ is too larger than the surface tension of the resin binder, the anisotropic conductive adhesive has too good wettability for the first conductive pattern, probably inducing unintended leak of the anisotropic conductive adhesive. However, the reason why the leak of the anisotropic conductive adhesive is suppressed is not limited thereto.

In this context, the surface free energy defined in the present embodiment will be described. In general, molecules present inside a resin are present in a state stabilized through interaction with their surrounding molecules, whereas molecules present in the resin surface receive a less stabilizing effect by their surrounding molecules because the molecules form the surface. Hence, the molecules present in the surface have larger free energy than that of the molecules present in the inside. This energy is called surface free energy.

According to the theoretical formula of Kaelbel and Uy, surface free energy γ possessed by substance surface can be represented by the formula (1) given below on the basis of a dispersive component ($\gamma^d$) and a polar component ($\gamma^p$). Surface free energy $\gamma_{SV}$ of a solid and surface free energy $\gamma_{LV}$ of a liquid can be represented by the expressions (2) and (3), respectively, given below. In this context, it is known that when a contact angle obtained by adding dropwise a certain solvent onto the surface of the base material which is a solid is defined as θ, the relationship of the following formula (4) holds.

$$\gamma=\gamma^d+\gamma^p \tag{1}$$

$$\gamma_{SV}=\gamma_{SV}^d+\gamma_{SV}^p \tag{2}$$

$$\gamma_{LV}=\gamma_{LV}^d+\gamma_{LV}^p \tag{3}$$

$$\gamma_{LV}(1+\cos\theta)/2=(\gamma_{SV}^d\times\gamma_{LV}^d)^{0.5}+(\gamma_{SV}^p\times\gamma_{LV}^p)^{0.5} \tag{4}$$

In order to determine unknown two components as to the surface free energy of a solid, the contact angle θ between the solvent and the side where the joint part 121 is formed is measured using two types of liquids having known surface free energy. Then, the simultaneous equation can be solved by the substitution of the obtained values into the formula (4) to determine a dispersive component ($\gamma_{SV}^d$) and a polar component ($\gamma_{SV}^p$) of the surface free energy on the side where the joint part 121 is formed. The surface free energy $\gamma_{SV}$ of the solid can be determined according to the formula (2).

The surface free energy $E_0$ can be adjusted, as mentioned later, by establishing a layer on base material surface or by selecting a component constituting the layer. The surface free energy $E_1$ can be adjusted by the types or ratios of a conductive component such as a conductive metal or a conductive polymer constituting the conductive pattern as well as other components constituting the conductive pattern, such as non-conductive component including metal oxide, a metal compound, and an organic compound. The surface free energy $E_1$ may be adjusted by ink composition as well as a calcination method because the states of non-conductive components contained in the conductive pattern differ depending on the calcination method of ink even if ink having the same composition is used for forming the conductive pattern.

In the present embodiment, improvement in bondability refers to improvement in the bonding reliability and the suppression of poor appearance. Hereinafter, each configuration will be described in detail.

[Transparent Base Material]

In the present embodiment, transparent base material 11 is used. In this context, the term "transparent" means that the visible light transmittance is preferably 80% or more, more preferably 90% or more, further preferably 95% or more. In this context, the visible light transmittance can be measured in accordance with JIS K 7361-1:1997.

The transparent base material 11 may be made of one material or may be made of two or more materials laminated with each other. When the base material is multi-layered such that two or more materials are laminated with each other, the base material may be made of organic base materials or inorganic base materials laminated with each other or may be made of an organic base material(s) and an inorganic base material(s) laminated with each other.

Examples of the form of the transparent base material 11 include a single-layer sheet of a core layer, a laminated sheet having the core layer and a first outermost layer, a laminated sheet having the core layer and a second outermost layer, a laminated sheet having the first outermost layer and the second outermost layer, and a laminated sheet having the core layer, the first outermost layer, and the second outermost layer. These laminated sheets may further have an additional layer between the core layer and the first outermost layer, between the core layer and the second outermost layer, or between the first outermost layer and the second outermost layer.

When the transparent base material 11 is a single-layer sheet of a core layer, the current-collecting part 12 (joint part 121) and the antenna part 13 is formed on the surface of the core layer. When the transparent base material 11 is a laminated sheet, the first outermost layer means a layer constituting the side where the current-collecting part 12 (joint part 121) and the antenna part 13 are formed, and the second outermost layer means the back side of the first outermost layer. Among others, the transparent base material 11 of the present embodiment preferably has the first outermost layer from the viewpoint of the adjustment of the surface free energy $E_0$. Hereinafter, the configuration of each layer will be described in detail.

(Core Layer)

The material constituting the core layer is not particularly limited and is preferably a material that contributes to improvement in the mechanical strength of the base material. Examples of such a material of the core layer include, but are not particularly limited to: transparent inorganic base materials such as quartz glass, borosilicate glass, soda-lime glass, and lead glass; and transparent organic base materials such as acrylic acid ester, methacrylic acid ester, polyethylene terephthalate, polybutylene terephthalate, polyethylene naphthalate, polycarbonate, polyarylate, polyvinyl chloride, polyethylene, polypropylene, polystyrene, nylon, aromatic polyamide, polyether ether ketone, polysulfone, polyethersulfone, polyimide, and polyetherimide. Among them, use of polyethylene terephthalate attains better productivity (cost reduction effect) for producing the transparent antenna. Use of polyimide attains better heat resistance of the transparent antenna. In the case of using polyimide, so-called transparent polyimide, which is excellent in visible light permeability, is more preferably used. Use of polyethylene terephthalate, polyethylene naphthalate, or quartz glass tends to further improve the adhesion of the transparent base material to the conductive fine wire.

The core layer may be made of one material or may be made of two or more materials laminated with each other. When the core layer is multi-layered in which two or more materials are laminated with each other, the base material may be made of organic base materials or inorganic base materials laminated with each other or may be made of an organic base material(s) and an inorganic base material(s) laminated with each other.

The thickness of the core layer is preferably 5 μm or larger and 500 μm or smaller, more preferably 10 μm or larger and 100 μm or smaller.

(First Outermost Layer)

When the transparent base material 11 is a laminate, the first outermost layer is a layer constituting the side where the current-collecting part 12 (joint part 121) and the antenna part 13 are formed. The material constituting the first outermost layer is not particularly limited and is preferably a material that contributes to improvement in the adhesion between the core layer and each of the current-collecting part 12 (joint part 121) and the antenna part 13. When the transparent base material 11 is in a form having the first outermost layer and the second outermost layer and having no core layer, the first outermost layer preferably contributes to improvement in the adhesion between the second outermost layer and each of the current-collecting part 12 (joint part 121) and the antenna part 13. When the transparent base material 11 has the first outermost layer, the surface free energy $E_0$ is the surface free energy of the first outermost layer.

Examples of the component contained in such a first outermost layer include, but are not particularly limited to: silicon compounds such as (poly)silanes, (poly)silazanes, (poly)silthianes, (poly)siloxanes, silicon, silicon carbide, silicon oxide, silicon nitride, silicon chloride, silicate, zeolite, and silicide; aluminum compounds such as aluminum oxide; and magnesium compounds such as magnesium fluoride.

Among them, a silicon compound is preferred, and a siloxane is more preferred. Use of such a component improves the surface free energy $E_0$ on the side of the transparent base material where the joint part 121 is formed.

In addition, the transparency and durability of the transparent antenna tend to be further improved.

Examples of the silicon compound include, but are not particularly limited to, condensates of polyfunctional organosilane, and polycondensates obtained by the hydrolysis reaction of polyfunctional organosilane or its oligomer with polyvinyl acetate.

Examples of the polyfunctional organosilane include, but are not particularly limited to: bifunctional organosilane such as dimethyldimethoxysilane, dimethyldiethoxysilane, diethyldimethoxysilane, diethyldiethoxysilane, diphenyldimethoxysilane, and diphenyldiethoxysilane; trifunctional organosilane such as methyltrimethoxysilane, methyltriethoxysilane, and phenyltrimethoxysilane; and tetrafunctional organosilane such as tetramethoxysilane and tetraethoxysilane.

The first outermost layer can be prepared by a film formation method of applying a composition containing the component for the first outermost layer to the core layer, followed by drying. The first outermost layer may be prepared by a vapor-phase film formation method such as PVD or CVD. The composition for forming the first outermost layer may contain, if necessary, a dispersant, a surfactant, a binder, or the like.

The thickness of the first outermost layer is preferably 0.01 µm or larger and 100 µm or smaller, more preferably 0.01 µm or larger and 10 µm or smaller, further preferably 0.01 µm or larger and 1 µm or smaller. The thickness of the first outermost layer falls within the range described above, whereby the adhesion is further improved. In addition, the transparency and durability of the transparent antenna tend to be further improved.

The first outermost layer laminated on the core layer can adjust the surface free energy $E_O$ and in addition, can prevent plasma or the like from etching the core layer at a site uncovered with the current-collecting part 12 (joint part 121) and the antenna part 13, for example, when the current-collecting part 12 (joint part 121) and the antenna part 13 are formed by sintering a metal component in ink by a calcination approach such as plasma. Particularly, the surface free energy E, at the opening part of the transparent base material 11 can be adjusted to a predetermined value by the calcination approach, such as plasm, described above, which is preferred.

This first outermost layer preferably further has an antistatic function in order to prevent the breaking of the current-collecting part 12 (joint part 121) and the antenna part 13 ascribable to static electricity. For the first outermost layer having an antistatic function, it is preferred that the first outermost layer should comprise at least any of a conductive inorganic oxide and a conductive organic compound.

(Second Outermost Layer)

When the transparent base material 11 is a laminate, the second outermost layer means the back side of the first outermost layer. Examples of the component contained in the second outermost layer include, but are not particularly limited to, melamine compounds, alkyd compounds, fluorine compounds, silicone compounds, polyethylene wax, fatty acids, and fatty acid esters. Among them, a melamine compound, an alkyd compound, a fluorine compound, or a silicone compound is preferred, and a melamine compound or an alkyd compound is more preferred. Use of such a component tends to further improve the transparency and durability of the transparent antenna.

The thickness of the second outermost layer is preferably 0.01 µm or larger and 100 µm or smaller, more preferably 0.01 µm or larger and 10 µm or smaller, further preferably 0.01 µm or larger and 1 µm or smaller. The thickness of the second outermost layer falls within the range described above, whereby the transparency and durability of the transparent antenna 10 tend to be further improved.

(Other Layers)

Examples of the additional layer disposed between the core layer and the first outermost layer, between the core layer and the second outermost layer, or between the first outermost layer and the second outermost layer include, but are not particularly limited to, easily adhesive layers. The easily adhesive layer is used for the purpose of improving the adhesion between the core layer and the first outermost layer, between the core layer and the second outermost layer, or between the first outermost layer and the second outermost layer.

[Joint Part]

The joint part 121 is a region that constitutes the ends of the current-collecting part 12 and is bonded to the semiconductor device 14. The joint part 121 (current-collecting part 12) is electrically bonded to the antenna part 13 and has first conductive pattern 300 and first opening part 301 without the first conductive pattern 300 formed thereon. In this context, the first conductive pattern 300 is a continuous pattern and has conductivity from an arbitrary point to another arbitrary point in the pattern. The current-collecting part 12 may have one or more electrically independent first conductive patterns 300.

FIGS. 2 and 4 show enlarged views of the S1a part of FIG. 1 and S1b of FIG. 3, respectively. FIGS. 2 and 4 each show an example in which the current-collecting part 12 (joint part 121) formed from the first conductive pattern 300 made of a thick conductive fine wire is electrically bonded to the antenna part 13 formed from second conductive pattern 400 made of a thinner conductive fine wire.

FIG. 6 illustrates an enlarged view of the S2 part of FIGS. 2 and 4 as one form of the joint part 121. In FIG. 6, the first conductive pattern 300 is shown as a grid pattern formed by a plurality of lines of the first conductive fine wire intersecting in a net-like form. The first conductive pattern 300 is not limited thereto and may be any of other patterns that are formed by intersecting lines of the first conductive fine wire and maintain conductivity. The first conductive pattern 300 may be a regular pattern or an irregular pattern. Further, the first conductive fine wire may be a straight line or a curved line.

Examples of the shape of the first opening part 301 include, but are not particularly limited to: triangles; quadrangles such as squares, rectangles, and rhombuses; pentagons; hexagons; and combinations of a plurality of polygons.

Examples of the configuration of the current-collecting part 12 include, but are not particularly limited to, a configuration in which the current-collecting part 12 having a size so as to be almost covered up with the semiconductor device 14 is disposed such that a plurality of antenna parts 13 are connected (see FIG. 1), a configuration in which the semiconductor device 14 is bonded to a portion of loop-shaped current-collecting part 12 while the antenna part 13 is disposed in the outer periphery of the loop-shaped current-collecting part 12 (see FIG. 3), and a configuration in which the current-collecting part 12 is disposed at an arbitrary site of one antenna part 13. The bonding position (joint part 121) of the semiconductor device 14 to the current-collecting part 12 is not particularly limited and is preferably a position at which the ends of the current-collecting part 12 face each other.

[Antenna Part 13]

The antenna part 13 is electrically bonded to the current-collecting part 12 (joint part 121) and has second conductive pattern 400 and second opening part 401 which is formed between lines of the pattern and does not have the second conductive pattern 400 formed thereon. This antenna part 13 exists as an antenna region capable of sending and receiving predetermined electromagnetic waves. In this context, the second conductive pattern 400 is a continuous pattern and has conductivity from an arbitrary point to another arbitrary point in the pattern. The antenna part 13 may have one or more electrically independent second conductive patterns 400.

The antenna part 13 has various forms depending on the type thereof. Examples of the type of the antenna part 13 include, but are not particularly limited to, electrical field antennas, such as dipole antennas and patch antennas, which generate current by change in electrical field, and magnetic field antennas, such as loop antennas, which generate current by change in magnetic field.

A shape known in the art can be used as the profile of the antenna part 13. Examples of the profile of a linear dipole antenna include not only straight line shapes but various shapes known in the art such as folded, meandered, helical, and spiral shapes. Also, examples of the profile of a patch antenna include arbitrary profiles such as polygonal and round shapes as well as shapes having an incision in these shapes. Alternatively, the antenna part 13 may have a combination of a plurality of these shapes.

The antenna part 13 also preferably has a second conductive pattern having a second conductive fine wire. FIG. 7 illustrates an enlarged view of the S3 part of FIGS. 2 and 4 as one form of the antenna part 13. In FIG. 7, second conductive pattern 400 is shown as a grid pattern formed by a plurality of lines of the second conductive fine wire intersecting in a net-like form. The second conductive pattern 400 is not limited thereto and may be any of other patterns that are formed by intersecting lines of the second conductive fine wire and maintain conductivity. The second conductive pattern 400 may be a regular pattern or an irregular pattern. Further, the second conductive fine wire may be a straight line or a curved line.

Examples of the shape of the part where the second conductive pattern 400 is not formed, i.e., the second opening part 401, include, but are not particularly limited to: triangles; quadrangles such as squares, rectangles, and rhombuses; pentagons; hexagons; and combinations of a plurality of polygons.

FIGS. 1 and 3 each show an example showing the configuration of an RF tag having an electrical field antenna as the antenna part 13. In FIG. 1, two antenna parts 13 are formed around relatively small current-collecting part 12 having a size so as to be almost covered up with the semiconductor device 14. In FIG. 3, the antenna part 13 is formed so as to surround loop-shaped current-collecting part 12. In both FIGS. 1 and 3, the antenna part 13 has a rectangular profile such as an oblong shape. In FIGS. 1 and 3, the antenna part 13 is not in a form having a flat surface fully coated with a conductive layer, and is constituted by a grid pattern formed from the second opening part 401 and the second conductive pattern 400. As a result, the transparency of a region where the antenna part is formed can be secured while the antenna part 13 maintains its functions as an electrical field antenna.

(First Conductive Pattern 300 and Second Conductive Pattern 400)

The first conductive pattern 300 and the second conductive pattern 400 each comprise a conductive component. Examples of the conductive component include, but are not particularly limited to, conductive metals and conductive polymers. The first conductive pattern 300 and the second conductive pattern 400 may each comprise a non-conductive component. Examples of the conductive metal include, but are not particularly limited to, gold, silver, copper, and aluminum. Among them, silver or copper is preferred, and relatively inexpensive copper is more preferred. Use of such a conductive metal tends to attain better conductivity of the transparent antenna. A conductive polymer known in the art can be used. Examples thereof include polyacetylene and polythiophene.

Examples of the non-conductive component include, but are not particularly limited to, metal oxides, metal compounds, and organic compounds. More specifically, examples of these non-conductive components include metal oxides, metal compounds, and organic compounds that are components derived from components contained in ink mentioned later and remain in the conductive fine wire after calcination among the components contained in ink.

The content ratios of the conductive component in the first conductive pattern 300 and the second conductive pattern 400 are each independently preferably 50% by mass or more, more preferably 60% by mass or more, further preferably 70% by mass or more. The upper limit of the content ratio of the conductive component is not particularly limited and is 100% by mass. The content ratios of the non-conductive component in the first conductive pattern 300 and the second conductive pattern 400 are each independently preferably 50% by mass or less, more preferably 40% by mass or less, further preferably 30% by mass or less. The lower limit of the content ratio of the non-conductive component is not particularly limited and is 0% by mass.

(Line Width W)

Line width W of each of the first conductive fine wire and the second conductive fine wire in the first conductive pattern 300 and the second conductive pattern 400 refers to line width W when the conductive fine wire is projected onto the surface of the transparent base material 11 from the side where the conductive pattern is disposed, of the transparent base material 11. The line width W of a conductive fine wire having a trapezoidal cross-section where the base on the interface side with the transparent base material 11 is longer is the width on the side contacted with the transparent base material 11, of the conductive fine wire.

The line width $W_1$ of the first conductive fine wire is preferably 0.5 to 200 μm, more preferably 1 to 150 μm, further preferably 2 to 100 μm. The line width $W_1$ of the first conductive fine wire falls within the range described above, whereby bondability is further improved while antenna characteristics such as gain tend to be further improved. The line width $W_1$ of the first conductive fine wire is 200 μm or smaller, whereby the visibility of the first conductive pattern 300 is further reduced. Thus, the transparency of the current-collecting part 12 (joint part 121) tends to be further improved.

The line width $W_2$ of the second conductive fine wire is preferably 0.25 to 7.5 μm, more preferably 0.25 to 5.0 μm, further preferably 0.25 to 4.0 μm, particularly preferably 0.50 to 3.0 μm. The line width $W_2$ of the second conductive fine wire is 0.25 μm or larger, whereby the conductivity of the antenna part 13 tends to be further improved. Reduction in conductivity ascribable to the oxidation, corrosion, or the like of the surface of the conductive fine wire can be sufficiently suppressed. On the other hand, the line width $W_2$ of the second conductive fine wire is 10.0 µm or smaller, whereby the visibility of the second conductive pattern 400 is further reduced. Thus, the transparency of the antenna part 13 tends to be further improved.

In the first conductive pattern 300 and/or the second conductive pattern 400, when the line width $W_1$ and/or the line width $W_2$ is not a constant value and assumes a plurality of values, all the values of the line width $W_1$ and/or the line width $W_2$ preferably satisfy the range described above.

(Height T)

The height $T_1$ of the first conductive fine wire and the height $T_2$ of the second conductive fine wire are each independently preferably 0.05 to 1.0 µm, more preferably 0.07 to 0.8 µm, further preferably 0.1 to 0.5 µm. Each of the heights $T_1$ and $T_2$ is 0.05 µm or larger, whereby conductivity tends to be further improved. Reduction in conductivity ascribable to the oxidation, corrosion, or the like of the surface of the conductive fine wire tends to be able to be sufficiently suppressed. On the other hand, each of the heights $T_1$ and $T_2$ is 1.0 µm or smaller, whereby high transparency tends to be exerted in a wide view angle.

In the first conductive pattern 300 and/or the second conductive pattern 400, when the height $T_1$ and/or the height $T_2$ is not a constant value and assumes a plurality of values, all the values of the height $T_1$ and/or the height $T_2$ preferably satisfy the range described above.

(Pitch P)

The pitch $P_1$ of the first conductive fine wire is preferably 0.5 to 25 µm, more preferably 1.0 to 10 µm, further preferably 2.0 to 7.0 µm. The pitch $P_1$ falls within the range described above, whereby bondability is further improved while antenna characteristics such as gain tend to be further improved. The pitch P is the distance between lines of the conductive fine wire.

The pitch $P_2$ of the second conductive fine wire is preferably 20 to 1000 µm, more preferably 40 to 750 µm, further preferably 60 to 300 µm. The pitch $P_2$ is 20 µm or larger, whereby the transparency of the antenna part 13 tends to be further improved. The pitch $P_2$ is 1000 µm or smaller, whereby conductivity tends to be further improved.

The pitch $P_1$ of the first conductive fine wire is preferably smaller than the pitch $P_2$ of the second conductive fine wire. The difference therebetween $(P_2-P_1)$ is preferably 30 to 1000 µm, more preferably 50 to 500 µm, further preferably 100 to 300 µm. The difference $(P_2-P_1)$ falls within the range described above, whereby the visibility of the joint part is reduced so that design tends to be further improved.

In the first conductive pattern 300 and/or the second conductive pattern 400, when the pitch $P_1$ and/or the pitch $P_2$ is not a constant value and assumes a plurality of values, all the values of the pitch $P_1$ and/or the pitch $P_2$ preferably satisfy the range described above.

(Occupied Area Ratio S)

The occupied area ratio $S_1$ of the first conductive pattern 300 is preferably 30 to 90%, more preferably 30 to 80%, further preferably 40 to 80%, particularly preferably 50 to 80%. The occupied area ratio $S_1$ falls within the range described above, whereby bondability is further improved while antenna characteristics such as gain tend to be further improved.

The occupied area ratio $S_2$ of the second conductive pattern 400 is preferably 0.1 to 10.0%, more preferably 0.5 to 5.0%, further preferably 1.0 to 3.0%. The occupied area ratio $S_2$ is 0.1% or more, whereby the characteristics of the antenna part 13 tend to be further improved. The occupied area ratio $S_2$ is 10.0% or less, whereby the transparency of the antenna part 13 tends to be further improved.

The occupied area ratio $S_1$ of the first conductive pattern is preferably larger than the occupied area ratio $S_2$ of the second conductive pattern. The difference therebetween $(S_1-S_2)$ is preferably 3 to 50%, more preferably 9 to 50%, further preferably 15 to 50%. The difference $(S_1-S_2)$ falls within the range described above, whereby the visibility of the joint part is reduced so that design tends to be improved.

The "occupied area ratio S of the conductive pattern" can be calculated according to the formula given below as to a region where the conductive pattern is formed on the transparent base material. The region where the conductive pattern is formed on the transparent base material is a range represented by $S_2$ or $S_3$ of FIG. 4 and excludes edges, etc. where no conductive pattern is formed.

Occupied area ratio $S$ of the conductive pattern=
(Area occupied by the conductive pattern/Area of the transparent base material 11)×100

The line width, height, pitch, and occupied area ratio, etc. of the conductive pattern can be confirmed by observing the surface or cross-section of the transparent antenna under an electron microscope, a laser microscope, an optical microscope, or the like. Examples of the method for adjusting the line width and pitch of the conductive pattern to the desired ranges include a method of adjusting grooves of a plate for use in a method for producing the transparent antenna mentioned later, and a method of adjusting the average particle size of metal particles in ink.

(Shape)

The cross-sectional shape of each of the first conductive fine wire and the second conductive fine wire can be defined by the line width W and the height T of the conductive fine wire. Heights from the interface between the transparent base material 11 and the conductive fine wire are defined as 0.50 T and 0.90 T based on the height T of the conductive fine wire. The width of the conductive fine wire at the height 0.50 T is defined as $W_{0.50}$, and the width of the conductive fine wire at the height 0.90 T is defined as $W_{0.90}$. In this respect, $W_{0.50}/W_0$ is preferably 0.70 to 0.99, more preferably 0.75 to 0.99 or less, further preferably 0.80 to 0.95. $W_{0.90}/W_{0.50}$ is preferably 0.50 to 0.95, more preferably 0.55 to 0.90, further preferably 0.60 to 0.85. In the transparent antenna of the present embodiment, $W_{0.50}/W_0$ is preferably larger than $W_{0.90}/W_{0.50}$. Specifically, it is preferred that the width of the conductive fine wire should decrease gradually from a height position at a thickness of 0.50 T toward a height position at a thickness of 0.90 T from the interface of the conductive fine wire on the transparent base material 11 side.

As mentioned later, the transparent antenna of the present embodiment can be formed by a printing method using ink. The conductive fine wire formed by the method has the characteristic shape as described above. Other possible methods for forming the conductive fine wire are a method using a nanoimprint method or a lithography method, other methods using nanowire, and the like. However, conductive fine wires prepared by these methods differ in the shape from the conductive fine wire formed by the printing method.

(Sheet Resistance)

The sheet resistance of each of the first conductive pattern 300 and the second conductive pattern 400 is preferably 0.1 Ω/sq or more and 1,000 Ω/sq or less, more preferably 0.1 Ω/sq or more and 500 Ω/sq or less, further preferably 0.1 Ω/sq or more and 100 Ω/sq or less, still further preferably 0.1 Ω/sq or more and 20 Ω/sq or less, even further preferably 0.1 Ω/sq or more and 10 Ω/sq or less.

The sheet resistance of the transparent antenna can be measured by a method given below. First, a rectangular portion throughout which the conductive pattern is disposed is cut out of the transparent antenna to obtain a measurement sample. Current-collecting parts for sheet resistance measurements electrically connected to the conductive pattern are formed at both ends of the obtained measurement sample. Electrical resistance R (Ω) between the current-collecting parts disposed at both ends is measured. Sheet resistance $R_s$ (Ω/sq) can be calculated according to the following formula from the obtained electrical resistance R (Ω), distance L (mm) between the current-collecting parts of the measurement sample, and length D (mm) in the depth direction.

$$R_s=R/L\times D$$

The sheet resistance of the transparent antenna 10 tends to be reduced by improving the height of the conductive fine wire. The sheet resistance may be adjusted by selecting the type of the metal material constituting the conductive fine wire.

(Visible Light Transmittance)

The visible light transmittance $VT_1$ of the first conductive pattern 300 is preferably 30 to 80%, more preferably 40 to 75%, further preferably 45 to 70%. In this context, the visible light transmittance can be measured in accordance with JIS K 7361-1:1997 for total light transmittance by calculating the transmittance in a range of the visible light (360 to 830 nm).

The visible light transmittance $VT_2$ of the second conductive pattern 400 is preferably 80% or more and 100% or less, more preferably 90% or more and 100% or less.

The visible light transmittance of the transparent antenna 10 tends to be improved by decreasing the line width of the conductive pattern or by improving the occupied area ratio.

[Method for Producing Transparent Antenna]

Examples of the method for producing the transparent antenna include a method having a pattern formation step of forming a pattern on the transparent base material 11 using ink containing a metal component, and a calcination step of calcining the ink to form current-collecting part 12 (joint part 121) and antenna part 13. The method may further have a surface treatment step of treating the surface of the transparent base material 11, from the viewpoint of adjusting the surface free energy of the first opening part 301.

[Surface Treatment Step]

In the surface treatment step, a first outermost layer can be disposed on one side of a core layer, or the surface roughness of the transparent base material 11 can be adjusted, from the viewpoint of adjusting surface free energy.

Examples of the method for forming the first outermost layer include, but are not particularly limited to, a method of forming a film from a component for the first outermost layer on one side of the core layer by use of a vapor-phase film formation method such as PVD or CVD. Another example of the method includes a method of forming the first outermost layer by applying a composition containing a component for the formation of the first outermost layer to one side of the core layer, followed by drying.

Examples of the method for increasing the surface roughness of the transparent base material 11 which is generally flat and smooth include, but are not particularly limited to, a method of establishing an easily adhesive layer having large surface roughness between the core layer and the first outermost layer, and forming the first outermost layer on the easily adhesive layer. The resulting first outermost layer reflects the surface roughness of the easily adhesive layer.

[Pattern Formation Step]

The pattern formation step is the step of forming a pattern using ink containing a metal component. The pattern formation step is not particularly limited as long as the step is performed by a plate printing method using a plate having grooves of the desired conductive pattern. Such a method has, for example, the steps of: coating transfer medium surface with ink; allowing the transfer medium surface coated with ink to face the relief part surface of a relief printing plate, and pressing and contacting these surfaces to shift the ink on the transfer medium surface onto the relief part surface of the relief printing plate; and allowing the surface of the transfer medium having remaining ink to face the surface of the transparent base material 11, and pressing and contacting these surfaces to transfer the ink remaining on the transfer medium surface to the surface of the transparent base material 11. When the first outermost layer is formed on the transparent base material 11, the ink is transferred to the surface of the first outermost layer.

(Ink)

The ink for use in the pattern formation step contains a conductive component, and a solvent and may contain, if necessary, a surfactant, a dispersant, a reducing agent, or the like. When the conductive component is a metal component, the metal component may be contained as metal particles in the ink or may be contained as a metal complex in the ink.

The average primary particle size of metal particles is preferably 100 nm or smaller, more preferably 50 nm or smaller, further preferably 30 nm or smaller. The lower limit of the average primary particle size of the metal particles is not particularly limited and is, for example, 1 nm or larger. The average primary particle size of the metal particles is 100 nm or smaller, whereby the line width W of the resulting conductive fine wire can be further thinned. The "average primary particle size" refers to the particle size of each individual metal particle (so-called primary particle) and is distinguished from an average secondary particle size which is the particle size of an aggregate (so-called secondary particle) formed by a plurality of metal particles together.

Examples of the metal particles include, but are not particularly limited to, metal oxides such as copper oxide, metal compounds, and core/shell particles having copper in the core part and copper oxide in the shell part. The form of the metal particles can be appropriately determined from the viewpoint of dispersibility and sinterability.

Examples of the surfactant include, but are not particularly limited to, fluorine surfactants. Use of such a surfactant improves the coatability of a transfer medium (blanket) with the ink and the smoothness of the ink used in coating and tends to produce a more uniform coating film. The surfactant is preferably configured so as to permit dispersion of the metal component and to be less likely to remain in calcination.

Examples of the dispersant include, but are not particularly limited to, a dispersant that noncovalently binds to or interacts with the metal component surface, and a dispersant that covalently binds to the metal component surface. Examples of the functional group for noncovalent binding or interaction include dispersants having a phosphoric acid group. Use of such a dispersant tends to further improve the dispersibility of the metal component.

Examples of the solvent include: alcohol solvents such as monoalcohols and polyalcohols; alkyl ether solvents; hydrocarbon solvents; ketone solvents; and ester solvents. These solvents may be used singly, or one or more thereof may be used in combination. For example, a monoalcohol having 10 or less carbon atoms and a polyalcohol having 10 or less carbon atoms are used in combination. Use of such a solvent tends to further improve the coatability of a transfer medium (blanket) with the ink, the transferability of the ink from a transfer medium to a relief printing plate, the transferability of the ink from the transfer medium to the transparent base material, and the dispersibility of the metal component. The solvent is preferably configured so as to permit dispersion of the metal component and to be less likely to remain in calcination.

[Calcination Step]

In the calcination step, for example, the metal component in the ink transferred to the surface of the transparent base material 11 is sintered to form current-collecting part 12 (joint part 121) and antenna part 13. The calcination is not particularly limited as long as the method therefor can form a metal component sintered film by the fusion of the metal component. The calcination may be performed in, for example, a calcination furnace, or may be performed using plasma, a heating catalyst, ultraviolet ray, vacuum ultraviolet ray, electron beam, infrared lamp annealing, flash lamp annealing, laser, or the like. If the resulting sintered film is easily oxidized, the calcination is preferably performed in a non-oxidative atmosphere. If the metal oxide or the like is difficult to reduce with only the reducing agent that may be contained in the ink, the calcination is preferably performed in a reductive atmosphere.

The non-oxidative atmosphere is an atmosphere free from an oxidative gas such as oxygen and includes an inert atmosphere and a reductive atmosphere. The inert atmosphere is an atmosphere filled with an inert gas, for example, argon, helium, neon, or nitrogen. The reductive atmosphere refers to an atmosphere where a reductive gas such as hydrogen or carbon monoxide exists. A calcination furnace may be filled with such a gas, and the ink-coated film (dispersion-coated film) can be calcined in a closed system. Alternatively, the dispersion-coated film may be calcined in the circulated system of a calcination furnace where such a gas is allowed to flow. In the case of calcining the dispersion-coated film in a non-oxidative atmosphere, it is preferred that the calcination furnace should be temporarily vacuumized so that oxygen in the calcination furnace is removed and replaced with a non-oxidative gas. The calcination may be performed in a pressurized atmosphere or may be performed in a reduced pressure atmosphere.

The calcination temperature is not particularly limited and is preferably 20° C. or higher and 400° C. or lower, more preferably 50° C. or higher and 300° C. or lower, further preferably 80° C. or higher and 200° C. or lower. The calcination temperature of 400° C. or lower is preferred because a low heat-resistant substrate can be used. The calcination temperature of 20° C. or higher is preferred because the formation of a sintered film tends to proceed sufficiently, resulting in favorable conductivity. The resulting sintered film contains a conductive component derived from the metal component and may additionally contain the component used in the ink, or a non-conductive component according to the calcination temperature.

[RF Tag]

RF tag 100 of the present embodiment comprises the transparent antenna 10 and semiconductor device 14 electrically bonded to the joint part 121 of the transparent antenna 10. FIG. 7 shows a cross-sectional view of the RF tag 100 of the present embodiment. As shown in FIG. 7, the semiconductor device 14 is preferably electrically bonded to the joint part 121 through anisotropic conductive adhesive 15 such as an anisotropic conductive paste or an anisotropic conductive film.

FIGS. 1 and 2 each show, as the RF tag 100, a passive tag which has no built-in battery and operates by using radio waves received from a reader writer as an energy source. Alternatively, the RF tag 100 of the present embodiment may be an active tag which has a built-in battery (not shown) and employs its power as a power source for transmission and reception or an internal circuit, or a semi-passive tag which has a built-in battery as an additional sensor or a power source for a sensor. In the present embodiment, the RF tag refers to a tag capable of transmitting and receiving a specific frequency by having the transparent antenna 10. Thus, a so-called IC tag is also included in the RE tag according to the present embodiment as long as the IC tag satisfies the configuration described above.

A semiconductor device known in the art can be used as the semiconductor device 14 according to the purpose of the RF tag 100. The semiconductor device 14 is not particularly limited by its configuration and has, for example, functional parts such as a storage, a power source rectifier, a receiver, a controller, and a sender.

Each functional part and one example of the operation of passive RF tag 100 of the present embodiment will be described. First, the antenna part 13 of the RF tag 100 receives radio waves from a reader writer, and electromotive force occurs by electromagnetic induction or the like. Then, this electromotive force actuates the semiconductor device 14 of the RF tag 100. In this respect, the power source rectifier converts alternate current input in the antenna part 13 to direct current and supplies a power source to a circuit of the semiconductor device 14. In parallel therewith, the receiver demodulates carrier waves received from the reader writer to a signal sequence and transmits the signal sequence to the controller. The controller performs information reading and/or writing to the storage or the transfer of information processing results as a signal sequence to the sender according to the signal sequence obtained from the receiver. In this context, the storage stores various pieces of information such as commodity information according to the purpose of the RF tag. Finally, the sender modulates the signal sequence obtained from the controller to carrier waves and sends the carrier waves from the antenna part 13. Then, an antenna of the reader writer receives the carrier waves and processes information. In the present embodiment, RFID refers to a system comprising the RF tag and the reader writer.

Examples of the frequency band that may be used by the RF tag 100 of the present embodiment include, but are not particularly limited to, LF band (medium wave band): 120 to 130 kHz, HF band (short wave band): 13.56 MHz, UHF band (ultrashort wave band): a band of 900 MHz, and microwave: a band of 2.45 GHz. The type of the antenna part 13 can be appropriately adjusted according to the frequency band used. In the case of using, for example, the HF band, a loop-type antenna can be used. In the case of using the UHF band, a dipole-type antenna can be used.

The transmission and reception scheme that may be used by the RF tag 100 of the present embodiment is not limited to the radio wave scheme. An electromagnetic coupling scheme which involves applying high-frequency waves to the respective coils of the sending side and the reception side, and putting information on the resulting mutual induction, or an electromagnetic induction scheme which involves putting information on a magnetic field generated near the antenna, and performing information communication, may be used.

The diameter d of the conductive fine particles contained in the anisotropic conductive adhesive is preferably 3.0 to 10

μm, more preferably 4.0 to 9.0 μm. The diameter d of the conductive fine particles falls within the range described above, whereby bondability tends to be further improved.

The pitch $P_1$ and the thickness $T_1$ of the first conductive pattern formed in the current-collecting part 12 (joint part 121) and the diameter d of the conductive fine particles preferably satisfy the following formula (5):

$$(P_1/2)^2 < (d/2)^2 - (d/2 - T_1)^2 \quad \text{Formula (5)}$$

EXAMPLES

Hereinafter, the present invention will be described more specifically with reference to Examples and Comparative Example. The present invention is not limited by the following Examples by any means.

Example 1

A polyethylene terephthalate (PET) film (manufactured by Toyobo Co., Ltd., product name: Cosmoshine A4100, film thickness: 50 μm) having an easily adhesive layer formed on one side was used as a core layer. A composition constituted by 2% by weight of silicon oxide nanoparticles, 1% by weight of a conductive organosilane compound, 65% by weight of 2-propanol, 25% by weight of 1-butanol, and 7% by weight of water was applied onto one side where no easily adhesive layer was formed, and dried so that a silicon oxide-containing film having a thickness of 50 nm and containing silicon oxide was formed to obtain base material A as the first outermost layer.

Subsequently, 20 parts by mass of cuprous oxide nanoparticles having a particle size of 21 nm, 4 parts by mass of a dispersant (manufactured by BYK-Chemie GmbH, product name: Disperbyk-145), 1 part by mass of a surfactant (manufactured by AGC Seimi Chemical Co., Ltd., product name: S-611), and 75 parts by mass of ethanol were mixed and dispersed to prepare ink having a cuprous oxide nanoparticle content ratio of 20% by mass.

Then, ink was applied to transfer medium surface. The transfer medium surface coated with ink was allowed to face a plate having grooves of a conductive pattern, pressed and contacted to shift a portion of the ink on the transfer medium surface to the relief part surface of the plate. Then, the transfer medium surface coated with the remaining ink was allowed to face the base material A, pressed and contacted to transfer ink having the desired conductive pattern onto the first outermost layer of the base material A.

Subsequently, the ink having the conductive pattern (dispersion-coated film) was calcined by flash lamp annealing in a room temperature environment using Pulseforge 1300 manufactured by NovaCentrix. The conductive pattern in the antenna part was a square grid pattern having line width $W_2$ of 3.0 μm, height $T_2$ of 0.5 μm, opening pitch $P_2$ of 60 μm, and occupied area ratio $S_2$ of 10%. The conductive pattern in the joint part was a square grid pattern having line width $W_1$ of 1.0 μm, height $T_1$ of 0.5 μm, opening pitch $P_1$ of 3.0 μm, and occupied area ratio $S_1$ of 56%.

The antenna part was, as shown in FIG. 1, a dipole antenna in which two conductive patterns having a rectangular shape of 49 mm in long sides and 10 mm in short sides were disposed at a 2-mm interval such that their short sides faced each other and the gap in the joint part formed between the two conductive patterns was set to 150 μm.

In both the joint part and the antenna part, the conductive fine wire had $W_{0.50}/W_0$ larger than $W_{0.90}/W_{0.50}$. Surface free energy $E_1$ was 57 mJ/m$^2$, and surface free energy $E_0$ was 76 mJ/m$^2$.

Example 2

A transparent dipole antenna was obtained in the same manner as in Example 1 except that the conductive pattern in the joint part was a square grid pattern having line width $W_1$ of 3 μm, opening pitch $P_1$ of 6 μm, and occupied area ratio $S_1$ of 75%.

Example 3

A transparent dipole antenna was obtained in the same manner as in Example 2 except that a quartz glass base material having a thickness of 0.1 mm was used as the base material.

Example 4

A transparent dipole antenna was obtained in the same manner as in Example 2 except that polyethylene naphthalate (PEN) (manufactured by Toyobo Film Solutions Ltd., product name: Teonex Q51-A4, film thickness: 50 μm) was used as the base material.

Example 5

A transparent dipole antenna was obtained in the same manner as in Example 2 except that: polyethylene naphthalate (PEN) (manufactured by Toyobo Film Solutions Ltd., product name: Teonex Q51-A4, film thickness: 50 μm) was used as the base material; and a plasma calciner was used in the calcination step.

Comparative Example 1

A transparent antenna was obtained in the same manner as in Example 1 except that the first outermost layer was not formed. Surface free energy $E_1$ was 57 mJ/m$^2$, and surface free energy $E_0$ was 47 mJ/m$^2$.

Comparative Example 2

Ink having the same conductive pattern as that of Example 1 was transferred onto the first outermost layer of the base material A in the same manner as in Example 1. Then, the same composition as that of the first outermost layer (2% by weight of silicon oxide nanoparticles, 1% by weight of a conductive organosilane compound, 65% by weight of 2-propanol, 25% by weight of 1-butanol, and 7% by weight of water) was applied thereto and dried so that a silicon oxide-containing film having a thickness of 50 nm and containing silicon oxide was formed on both the surfaces of the conductive pattern and the base material A. Then, treatment by flash lamp annealing was performed in the same manner as in Example 1. The electrode part surface was covered with the silicon oxide-containing film without conduction. However, the conductive adhesive was able to be evaluated for its filling properties and leaking properties.

Reference Example 1

A transparent dipole antenna was obtained in the same manner as in Example 1 except that the conductive pattern in the joint part was a square grid pattern having line width $W_1$ of 10 µm, opening pitch $P_1$ of 3 µm, and occupied area ratio $S_1$ of 95%.

[Measurement of Dispersive Term γSD and Polar Term γSP of Surface Free Energy]

The method for measuring the dispersive term γSD and polar term γSP of surface free energy will be described.

The side where the joint part 121 was formed, of each of the base materials prepared in Examples and Comparative Examples was used as a measurement sample. Dispersive term γSD and polar term γSP of surface free energy were determined as average values from 3-point measurement. First, 2 µL each of pure water and diiodomethane was added dropwise, as two solvents having known surface tension γL, dispersive term γLD of the surface tension, and polar term γLP of the surface tension, onto the measurement sample.

The drops of the two solvents added dropwise onto the measurement sample were observed and photographed edge-on under a digital microscope (VHX-100 manufactured by Keyence Corp.). Contact angles formed by the measurement sample and the drops were directly measured with measurement software attached to the digital microscope to obtain respective contact angles when the two solvents were used.

Two sets of simultaneous equation obtained by the substitution of the obtained contact angles θ, surface tensions $\gamma_{LV}$ of water and diiodomethane, dispersion terms $\gamma_{LV}^d$ of the surface tensions, and polar terms $\gamma_{LV}^p$ of the surface tensions into the following formula (4) were solved to determine dispersion term $\gamma_{SV}^d$ and polar term $\gamma_{SV}^p$ of surface free energy of the measurement sample.

$$\gamma_{LV}(1+\cos\theta)/2 = (\gamma_{SV}^d \times \gamma_{LV}^d)^{0.5} + (\gamma_{SV}^p \times \gamma_{LV}^p)^{0.5} \quad (4)$$

[Line Width, Pitch, and Occupied Area Ratio]

The line width, the pitch, and the occupied area ratio were calculated from a planar photograph taken under an optical microscope.

[RF Tag]

A semiconductor device was bonded to the joint part of the transparent antenna obtained as described above using an anisotropic conductive paste (TAP0644F manufactured by KYOCERA Corp.) to obtain an RF tag.

[Bonding Reliability and Poor Appearance]

The joint part of each of Examples 1 to 5, Comparative Examples 1 and 2, and Reference Example 1 was observed under a digital microscope (VHX-100 manufactured by Keyence Corp.) from the back side of the transparent base material. The base material opening part in the joint part of each of Examples 1 to 5 was free from the incorporation of air bubbles, whereby adhesion reliability was ensured. The antenna part, the joint part, and the semiconductor device were electrically bonded and electrically continuous, whereby the RF tag was capable of receiving electromagnetic waves with a frequency of 800 MHz to 1000 MHz (bonding reliability in Table 1: graded as ◯). In Examples 1 to 3, the anisotropic conductive paste did not stray out of the joint part to the antenna part, and excellent appearance was obtained (appearance in Table 1: graded as ◯). In Examples 4 and 5, the anisotropic conductive paste was observed to slightly stray out of the joint part to the antenna part and however, did not largely impair appearance as the RF tag having transparency (appearance in Table 1: graded as Δ).

On the other hand, the joint part of Comparative Example 1 was found to have the incorporation of air bubbles and was thus inferior in adhesion reliability (graded as x in Table 1). Furthermore, the anisotropic conductive paste was observed to stray out of the joint part to the antenna part and impaired appearance as the RF tag having transparency (graded as x in Table 1). Moreover, variations in antenna characteristics were expected in Comparative Example 1 having such connectability.

The joint part of Comparative Example 2 was found to be free from the incorporation of air bubbles. Thus, favorable bonding reliability was expected if the joint part had conductivity (bonding reliability in Table 1: graded as (◯)). However, the anisotropic conductive paste was observed to heavily stray out of the joint part to the antenna part and impaired appearance as the RE tag having transparency (appearance in Table 1: x).

The joint part of Reference Example 1 was found to be free from the incorporation of air bubbles, whereby adhesion reliability was ensured. The antenna part, the joint part, and the semiconductor device were electrically bonded and electrically continuous, whereby the RF tag was capable of receiving electromagnetic waves with a frequency of 800 MHz to 1000 MHz (bonding reliability in Table 1: graded as ◯). However, the anisotropic conductive paste was observed to heavily stray out of the joint part to the antenna part and impaired appearance as the RF tag having transparency (appearance in Table 1: x). Too large a conductive pattern area in the joint part was expected to facilitate the leak of the anisotropic conductive paste to the antenna part along the conductive pattern.

TABLE 1

| | Surface free energy [mJ/m²] | | | Line width [µm] | | Pitch [µm] | | | Occupied area ratio [%] | | | Bondability | |
|---|---|---|---|---|---|---|---|---|---|---|---|---|---|
| | $E_0$ | $E_1$ | $E_0$-$E_1$ | $W_1$ | $W_2$ | $P_1$ | $P_2$ | $P_2$-$P_1$ | $S_1$ | $S_2$ | $S_1$-$S_2$ | Bonding reliability | Appearance |
| Example 1 | 76 | 57 | 19 | 1 | 3 | 3 | 60 | 57 | 56 | 10 | 46 | ◯ | ◯ |
| Example 2 | 76 | 57 | 19 | 3 | 3 | 6 | 60 | 54 | 75 | 10 | 65 | ◯ | ◯ |
| Example 3 | 77 | 57 | 20 | 3 | 3 | 6 | 60 | 54 | 75 | 10 | 65 | ◯ | ◯ |
| Example 4 | 58 | 57 | 1 | 3 | 3 | 6 | 60 | 54 | 75 | 10 | 65 | ◯ | Δ |
| Example 5 | 91 | 58 | 33 | 3 | 3 | 6 | 60 | 54 | 75 | 10 | 65 | ◯ | Δ |
| Comparative Example 1 | 47 | 57 | −10 | 2 | 3 | 3 | 60 | 57 | 56 | 10 | 46 | x | x |
| Comparative Example 2 | 76 | 76 | 0 | 1 | 3 | 3 | 60 | 57 | 56 | 10 | 46 | (◯) | x |
| Reference Example 1 | 76 | 57 | 19 | 10 | 3 | 5 | 60 | 55 | 95 | 10 | 85 | ◯ | x |

INDUSTRIAL APPLICABILITY

The present invention has industrial applicability as an RF tag usable in RFID, particularly, an RE tag for use for purposes that require design by exploiting transparency.

REFERENCE SIGNS LIST

10 . . . transparent antenna, 11 . . . transparent base material, 12 . . . current-collecting part, 121 . . . joint part, 13 . . . antenna part, 14 . . . semiconductor device, 15 . . . anisotropic conductive adhesive, 21 . . . conductive fine particle, 22 . . . resin binder, 100 . . . . RF tag, 300 . . . first conductive pattern, 301 . . . first opening part, 400 . . . second conductive pattern, and 401 . . . second opening part.

The invention claimed is:

1. A transparent antenna comprising
   a transparent base material,
   an antenna part, and a joint part electrically bonded to the antenna part, the antenna part and the joint part being arranged on the transparent base material, wherein
   the joint part has a first conductive pattern and a first opening part without the first conductive pattern formed thereon,
   the antenna part has a second conductive pattern and a second opening part without the second conductive pattern formed thereon,
   a surface free energy $E_1$ of the first conductive pattern is 60 mJ/m² or less, and
   a surface free energy $E_0$ of the transparent base material at the first opening part is larger than the surface free energy $E_1$.

2. The transparent antenna according to claim 1, wherein the second conductive pattern has a second conductive fine wire having line width $W_2$ of 0.25 μm or larger and 5.0 μm or smaller.

3. The transparent antenna according to claim 1, wherein a height $T_1$ of the first conductive pattern is 0.05 μm or larger and 1.0 μm or smaller, and
   a height $T_2$ of the second conductive pattern is 0.05 μm or larger and 1.0 μm or smaller.

4. The transparent antenna according to claim 1, wherein the first conductive pattern has a first conductive fine wire, and the second conductive pattern has a second conductive fine wire, wherein
   pitch $P_1$ of the first conductive fine wire is smaller than pitch $P_2$ of the second conductive fine wire,
   the pitch $P_1$ is 1.0 μm or larger and 10 μm or smaller, and
   the pitch $P_2$ is 20 μm or larger and 1000 μm or smaller.

5. The transparent antenna according to claim 1, wherein occupied area ratio $S_1$ of the first conductive pattern per unit area is larger than occupied area ratio $S_2$ of the second conductive pattern per unit area,
   the occupied area ratio $S_1$ is 30% or more and 90% or less, and
   the occupied area ratio $S_2$ is 0.1% or more and 10.0% or less.

6. The transparent antenna according to claim 1, wherein difference between the surface free energy $E_0$ and the surface free energy $E_1$ ($E_0$–$E_1$) is 10 to 30 mJ/m².

7. An RF tag comprising
   the transparent antenna according to claim 1, and
   a semiconductor device electrically bonded to the joint part of the transparent antenna.

8. The RF tag according to claim 7, wherein the semiconductor device is electrically bonded to the joint part through an anisotropic conductive adhesive.

\* \* \* \* \*